Nov. 26, 1968     E. C. WHITEHEAD ETAL     3,413,646
FILTER SYSTEM FOR RECORDING
Filed May 31, 1966
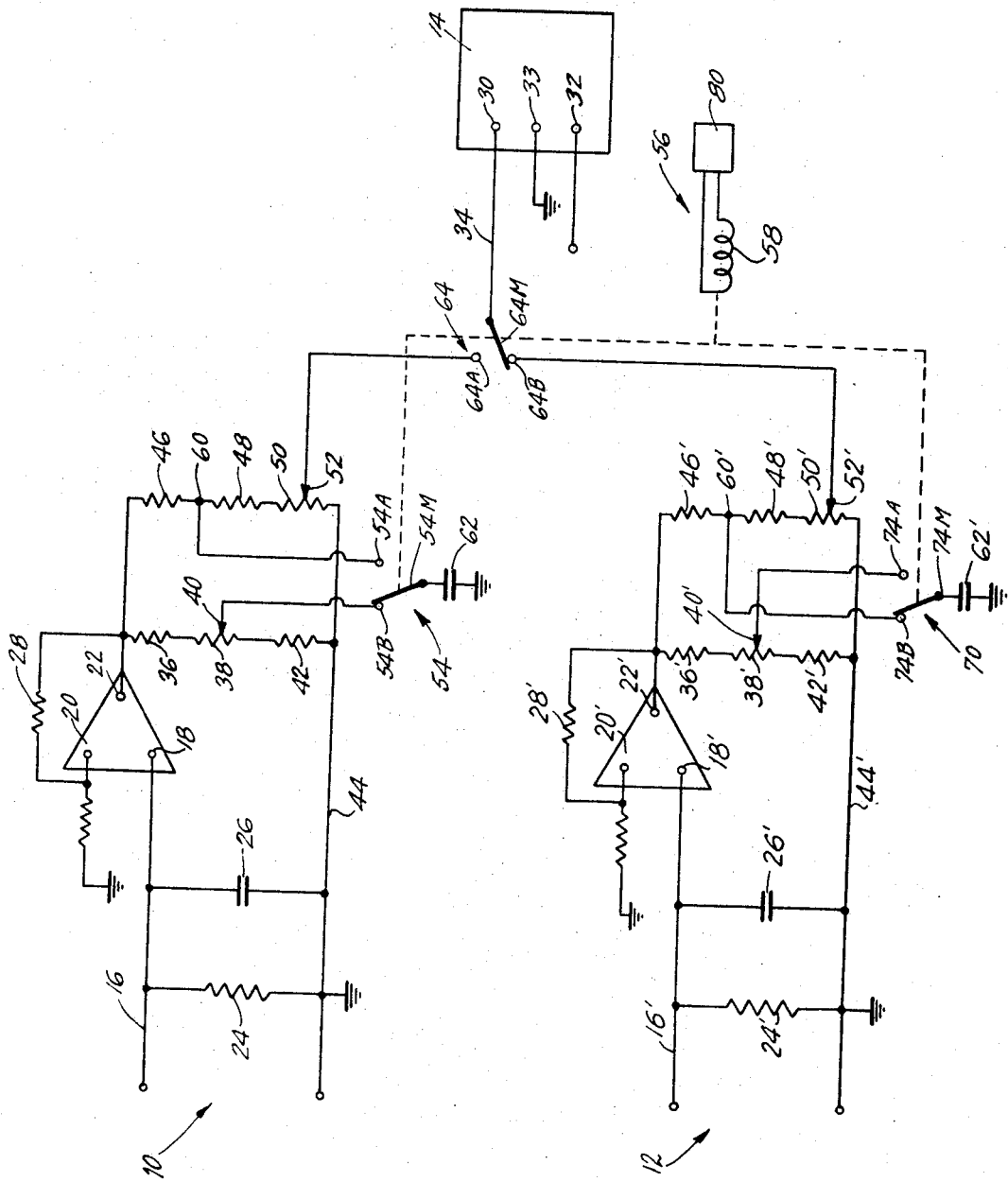
INVENTORS.
EDWIN C. WHITEHEAD
MILTON H. PELAVIN
WILLIAM A. WESCHLER
BY
ATTORNEY

3,413,646
FILTER SYSTEM FOR RECORDING
Edwin C. Whitehead, Rye, Milton H. Pelavin, White Plains, and William A. Weschler, Sparkill, N.Y., assignors to Technicon Corporation, a corporation of New York
Filed May 31, 1966, Ser. No. 554,083
4 Claims. (Cl. 346—1)

ABSTRACT OF THE DISCLOSURE

A system of recording a plurality of electrical signals includes sequentially coupling each of said signals to a filter network which includes a capacitor means; for each such signal, initially providing such filter network with a relatively short time constant, thereby permitting said capacitor means to rapidly and closely follow such signal, and subsequently providing said filter network with a relatively long time constant, permitting said filter network to adequately filter such signal, and recording such filtered signal.

---

This invention relates to signal recording, and especially to the recording of a plurality of sequentially provided signals.

This invention has utility in many fields, as will be obvious to those skilled in such fields, wherein it is desired to record a plurality of sequentially provided signals. However, the following discussion of the invention will concern itself with automatic analysis apparatus.

The automatic analysis of a plurality of samples supplied as a flowing stream of sequential liquid samples was early taught by Leonard T. Skeggs in U. S. Patent Nos. 2,797,149 and 2,879,141. Here each sequential liquid sample in turn was treated for quantitative analysis for a known constituent, and subsequently in turn was quantitatively analyzed for such known constituent in a flow-through colorimeter. The treatment included the addition of reagents to produce a color in each sample whose transmittance at a particular wavelength was responsive to the concentration of the constituent of interest in such sample. The colorimeter provided an output signal which was responsive to this transmittance. By linearizing this output signal from the colorimeter in accordance with Beer's law, a further output signal could be provided which was directly proportional to the concentration of the consituent of interest.

This first Skeggs disclosure, was of a single channel, single constituent, single signal arrangement. Subsequently, it has been taught that the initial stream of samples may be divided into a plurality of quotient streams of portions of samples, and that each quotient stream may be treated and quantitatively analyzed for a different respective constituent, independently of the other quotient streams. It has been taught by Leonard T. Skeggs et al. in U.S. Patent No. 3,241,432, that the portions in the respective quotient streams from a single sample in the initial stream may be transmitted to their respective colorimeters (or other analytic devices, such as a flame photometer) in sequential phase relation, and a single pen recorder may have an input channel selector switch which is in phase with such transmission, whereby the recorder records a portion of each signal provided by each channel.

Thus, for example, if analyses for eight constituents are to be made on each sample, the initial stream of samples will be divided into up to eight quotient streams, with respective analytic devices; each device providing a signal responsive to the concentration of a different constituent of interest. It may be noted that a colorimeter customarily analyzes a stream for only one constituent e.g. albumin, while a flame photometer for a stream may have a plurality of detectors, each providing a signal for a different constituent, e.g. sodium and potassium.

Customarily the signal provided by the analytic device for the respective constituent fluctuates according to two modes. Primarily, the signal falls to a minimum, e.g., between sequential portions from respective sequential samples, and rises to a maximum, in a portion where the reagent has developed pigment of minimum transmittance. It is this incremental length, customarily a plateau, which the input channel selector switch is phased to couple to the recorder. Secondarily, the signal continually fluctuates due to noise in the fluid system.

The time constant necessary to obtain good filtering at the plateau of the curve depends on the frequency of content of the noise. As the interval of the tests or charging time per test is reduced, the time constant may be excessively long and not permit the capacitor to charge to the final voltage in the time interval available.

Accordingly, it is an object of this invention to provide a recorder input which adequately filters the sequentially provided thereto signals which may be noisy and which are to be recorded, and yet has a short rise or fall time to reach a steady state output for each such signal.

A feature of this invention is the initial decreasing of the time constant of the filter input to a recorder in conjunction with the initial provision to said filter of such signal, to permit the capacitance of said filter to rapidly charge to the signal, and the subsequent increasing of the time constant of said filter, to permit said filter to adequately filter the noise and provide a steady state output to the recorder.

When a single recorder is continually coupled to a single channel which treats a plurality of samples sequentially and provides a signal responsive to each such sample, the time constant of the filter is initially made relatively low, concurrently with the initial provision of each such signal, and is subsequently made relatively high.

When a single recorder is sequentially and cyclically coupled to a plurality of channels, each of which channels treats a plurality of samples sequentially and provides a signal responsive to each such sample, a respective filter may be provided for each channel and the varying of the time constant may be made responsive to the output dwell of the recorder channel selector switch. The time constant is made relatively low when the respective channel is not coupled to the recorder, and is made relatively high when the respective channel is coupled to the recorder.

These and other objects, features and advantages will become apparent upon consideration of the following specification taken in conjunction with the accompanying drawing in which:

The figure is a schematic electrical circuit diagram of an embodiment of this invention.

A signal-output, recorder system is shown in the figure having a first channel signal-output 10, a similar channel signal-output 12, and a single channel recorder 14. The signal from the detector circuit of an analytic instrument, not shown, is coupled to a conductor 16 to the signal input terminal 18 of an operational amplifier 20 having a signal output terminal 22. This amplifier provides an amplified output signal across a much lower impedance than its input impedance. A resistor 24 and a capacitor 26 are assumed to exist at the amplifier input, but they have a negligible time constant. The amplifier is also provided with the customary feed-back loop 28. The input signal to the amplifier may, for example, but not by way of limitation, be 0 to 500 millivolts, full scale, the output signal from the amplifier may, for example, but not by way of limitation, be 0 to 5 volts, full scale.

The recorder 14, which may be a millivolt null balance recorder, has a signal input terminal 30 which is coupled to a channel selector switch by a conductor 34, a reference signal input terminal 32, and a ground terminal 33.

A resistor 36, a resistor 38 having a sliding tap 40, and a resistor 42 are connected in series between the amplifier signal output terminal 22 and a ground bus 44. A resistor 46, a resistor 48 and a resistor 50 having a sliding tap 52 are also connected in series between the terminal 22 and the ground bus. The tap 40 is connected to a fixed contact 54B of one deck 54 of a multideck stepping switch 56 which is stepped by a solenoid 58. The junction 60 of the resistors 46 and 48 is connected to a fixed contact 54A of the deck 54. The moving contact 54M of the deck 54 is connected to one plate of a capacitor 62 whose other plate is connected to ground.

The tap 52 is coupled to a fixed contact 64A of another deck 64 of the switch 56, which deck serves as the channel selector switch, and has a moving contact 64M.

The resistor 50 serves as a sensitivity control and has a resistance which is much less than that of the resistor 46 or 48, for example, but not by way of limitation, 10 kilohms.

Exemplary resistances of the resistors, which are not to be taken as limitative, are 2.55 kilohms for R36, 500 ohms for R38, 2.55 kilohms for R42, 221 kilohms for R46, and 221 kilohms for R48. The exemplary capacitance of the capacitor 62, which is not to be taken as limitative, is 137 microfarads.

It will be appreciated that when the moving contact 54M is connected to the fixed contact 54B, the filter network will have a time constant which is relatively low, in the order 0.2 second, and that when the moving contact 54M is connected to the fixed contact 54A, the filter network will have a time constant which is relatively high, in the order of 15 seconds. The tap 40 is adjustable to balance the resistors 36 and 42 so that the ratio of the resistances between the terminal 22 and the tap 40, and the tap 40 and ground, will be identical to the ratio of the resistances between the terminal 22 and the junction 60, and the junction 60 and ground. Thus the voltages at the tap 40 and at the junction 60 should be identical.

The second channel signal-output 12 is similar in construction to the first channel signal-output 10, and similar elements bear primed reference numerals. A third deck 70 of the switch 56 has a fixed contact 74B connected to the junction 60', a fixed contact 74A connected to the tap 40', and a moving contact 74M connected to a plate of a capacitor 62'.

Only two channels are here shown, and, therefore, only a two position (A and B) channel selector switch is shown therewith. In use, a programming device 80 controls the solenoid 58 to step the switch 56 between its A and B positions. When the switch is in its A position, the signal from the channel signal-output 10 is coupled to the recorder 14. The capacitor 62 is connected to the junction 60, and the signal from the amplifier output terminal 22 is heavily filtered. Meanwhile, in the channel signal-output 12, the capacitor 62' is connected to the tap 40' and the signal from the amplifier output terminal 22' is lightly filtered and rapidly charges the capacitor to the voltage at the tap 40'. Subsequently, when the signal at terminal 22' has reached its maximum plateau, the programming device 80 causes the solenoid 58 to step the switch 56 to its B position. The signal from the channel signal-output 12 is now coupled to the recorder 14. The capacitor 62' is connected to the junction 60' and the signal from the terminal 22' is heavily filtered. When the capacitor 62' was coupled to the tap 40' it was precharged or prebiased to the voltage which it found at the junction 40', therefore, no additional time was required to charge the capacitor 62' to the voltage at the junction 60' and the signal provided to the recorder was immediately responsive to, albeit heavily filtered, the signal provided at the amplifier output terminal 22'. At this time the capacitor 62 is connected to the tap 40, the filter network is in its low time constant configuration, and the charge on the capacitor 62 rapidly follows the voltage provided at the tap 40 to prebias the capacitor 62 to the voltage which it will subsequently encounter when it is connected to the junction 60. It will be appreciated that during the fast charging time, the capacitor follows the curve including the peaks and valleys of the noise. Therefore, at the instant of switching from the short time constant circuit to the long time constant circuit, the voltage on the capacitor may be slightly different from its final value. From a practical standpoint, this means that a compromise is made on the optimum time constant for each condition.

Should more channels be provided, for example, eight, then the channel selector switch 56 will be provided with eight positions. Each channel signal output will have one switch position at which its signal will be coupled to the recorder and its capacitor will be switched into the heavy filter position, at all other switch positions its capacitor will be switched into the low time constant position.

It will be appreciated that a single channel signal output and filter network (e.g., including 10 and omitting 12) may be utilized for a plurality of sequentially provided signals. For example, in an apparatus as shown in the U.S. patent application of Nelson G. Kling et al., S.N. 518,908, filed Jan. 5, 1966, and assigned to a common assignee, for determining the red blood cell count and the white blood cell count of each of a plurality of blood samples, a counter, which is controlled by a programming means, alternately provides an analogue signal responsive to the red cell count and then the white cell count for each sequential sample. These signals may be provided by the programming means to the input terminal 18 of the amplifier 20, while the output signal from the filter network is concurrently switched to the recorder across an appropriate sensitivity control 50. When the signal for a given counting operation and the appropriate sensitivity control are provided, the capacitor is initially switched to the tap 40, when the signal reaches its maximum plateau the capacitor is switched to the junction 60 and the signal is recorded. Then the programming means provides the next signal and switches in the appropriate sensitivity control.

What is claimed is:

1. Apparatus comprising: signal input means; signal output means; network means including a capacitor means and a switching means and coupled between said signal input means and said signal output means, said switching means being adapted to connect said capacitor means within said network means in a first configuration wherein said network means has a relatively short time constant and in a second configuration wherein said network means has a relatively long time constant; and wherein said network means includes a first potential divider having one end coupled to said signal input means, the other end coupled to a voltage reference and having an intermediate terminal; a second potential divider having one end coupled to said signal input means, the other end coupled to said voltage reference, a first intermediate terminal, and a second intermediate terminal coupled to said signal output means, said capacitor means having one plate coupled to said voltage reference and the other plate coupled to a moving contact of said switching means; said switching means having a first fixed contact coupled to said intermediate terminal of said first divider and a second fixed contact coupled to said first intermediate terminal of said second divider.

2. Apparatus according to claim 1 wherein the impedance ratios of said dividers are arranged to provide the same voltage at both of said terminals.

3. Apparatus comprising: signal input means; signal output means; network means including a capacitor means and a switching means and coupled between said signal input means and said signal output means, said switching means being adapted to connect said capacitor means within said network means in a first configuration wherein said network means has a relatively short time constant and in a second configuration wherein said network means has a relatively long time constant; further including a recording means, and additional switching means, and wherein a plurality of sets of said signal input signal output and network means are provided, one set for each signal provided in a cycle, said additional switching means being adapted to sequentially and cyclically couple the signal output means of each set to said recording means at which time the companion switching means of the network means of such set disposes such network means in its second configuration.

4. Apparatus according to claim 3 wherein when the switching means of one network means disposes such network means in its second configuration, at least the switching means of another network means disposes such another network means in its first configuration.

References Cited

UNITED STATES PATENTS 2,619,534   11/1952   Payne _____ 333—70

RICHARD B. WILKINSON, *Primary Examiner.*

E. C. SIMMONS, *Assistant Examiner.*